(12) United States Patent
Novak et al.

(10) Patent No.: US 9,608,773 B2
(45) Date of Patent: *Mar. 28, 2017

(54) TRANSMISSION OF SYMBOLS IN A MIMO ENVIRONMENT USING ALAMOUTI BASED CODES

(71) Applicant: Apple Inc., Cupertino, CA (US)

(72) Inventors: Robert Novak, Ottawa (CA); Hosein Nikopourdeilami, Ottawa (CA); Mo-Han Fong, Ottawa (CA); Sophie Vrzic, Nepean (CA)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/274,156

(22) Filed: Sep. 23, 2016

(65) Prior Publication Data

US 2017/0012741 A1    Jan. 12, 2017

Related U.S. Application Data

(63) Continuation of application No. 15/059,863, filed on Mar. 3, 2016, now Pat. No. 9,467,254, which is a
(Continued)

(51) Int. Cl.
    *H04L 1/02* (2006.01)
    *H04L 1/06* (2006.01)
    (Continued)

(52) U.S. Cl.
    CPC .......... *H04L 1/0668* (2013.01); *H04L 1/1812* (2013.01); *H04L 1/1893* (2013.01); *H04L 5/0026* (2013.01)

(58) Field of Classification Search
    CPC ... H04L 1/0668; H04L 1/1812; H04L 1/1893; H04L 5/0026
    (Continued)

(56) References Cited

U.S. PATENT DOCUMENTS

2004/0081254 A1    4/2004  Tirkkonen
2006/0078066 A1*   4/2006  Yun ................... H04B 7/068
                                                    375/299
(Continued)

FOREIGN PATENT DOCUMENTS

RU    2337483    10/2008
RU    2340100    11/2008
(Continued)

OTHER PUBLICATIONS

Office Action from Chinese Application No. 201080049530.5, issued Mar. 19, 2015, English and Chinese versions, pp. 1-15.
(Continued)

*Primary Examiner* — Daniel Washburn
*Assistant Examiner* — Fitwi Hailegiorgis
(74) *Attorney, Agent, or Firm* — Meyertons, Hood, Kivlin, Kowert & Goetzel, P.C.

(57) ABSTRACT

A method for transmitting data in a multiple-input-multiple-output space-time coded communication using a mapping table mapping a plurality of symbols defining the communication to respective antennae from amongst a plurality of transmission antennae and to at least one other transmission resource. The mapping table may comprise Alamouti-coded primary segments and may also comprise secondary segments, comprising primary segments. The primary segments in the secondary segments may be defined in accordance to an to Alamouti based code pattern applied at the segment level to define a segment-level Alamouti based code.

20 Claims, 15 Drawing Sheets

Related U.S. Application Data continuation of application No. 13/944,240, filed on Jul. 17, 2013, now Pat. No. 9,281,882, which is a continuation of application No. 12/874,001, filed on Sep. 1, 2010, now Pat. No. 9,276,655, which is a continuation-in-part of application No. 13/068,840, filed on Sep. 2, 2009, now abandoned.

(60) Provisional application No. 61/094,152, filed on Sep. 4, 2008.

(51) Int. Cl.
*H04L 5/00* (2006.01)
*H04L 1/18* (2006.01)

(58) Field of Classification Search
USPC .................................... 375/267, 260, 295
See application file for complete search history.

(56) References Cited

U.S. PATENT DOCUMENTS

| | | | |
|---|---|---|---|
| 2007/0105508 | A1 | 5/2007 | Tong et al. |
| 2007/0255993 | A1 | 11/2007 | Yap et al. |
| 2008/0237310 | A1 | 10/2008 | Periaman et al. |
| 2008/0267310 | A1 | 10/2008 | Khan et al. |
| 2008/0304593 | A1 | 12/2008 | Khan et al. |
| 2009/0041148 | A1 | 2/2009 | Li et al. |

FOREIGN PATENT DOCUMENTS

| | | |
|---|---|---|
| WO | 2006030478 | 3/2006 |
| WO | 2006076787 | 7/2006 |
| WO | 2006095877 | 9/2006 |
| WO | 2008123662 | 10/2008 |
| WO | 2008136648 | 11/2008 |
| WO | 2008137443 | 11/2008 |

OTHER PUBLICATIONS

Office Action from Korean Application No. 1020127008340, issued Mar. 20, 2015, English and Korean versions, pp. 1-12.
Notice of Allowance from Russian Application No. 2412-197820RU/8132, issued Feb. 2, 2015, English and Russian versions, pp. 1-15.
Notice of Allowance from Japanese Application No. 2012527170, issued Feb. 4, 2015, Japanese version, pp. 1-5.
International Search Report mailed on Jan. 13, 2011 in connection with international patent application PCT/CA2010/001376, 4 pages.
Written Opinion of the International Searching Authority mailed on Jan. 13, 2011 in connection with international patent application PCT/CA2010/001376, 6 pages.
IEEE 802.16 Broadband Wireless Access Working Group's Draft IEEE 802.16m System Description Document, IEEE 302.16m 138-003r1, Apr. 30, 2008, pp. 1-29.
European Search Report issued on May 8, 2013 for European Patent Application No. 10813208.5, pp. 1-8.
Jafarkhani, Hamid; "A Quasi-Orthogonal Space-Time Block Code;" IEEE Transactions on Communications, vol. 49, No. 1, Jan. 2001; pp. 1-4.
Tirkkonen, Olav; Hollinen, Ari; "Square-Matrix Embeddable Space-Time Block Codes for Complex Signal Constellations;" IEEE Transactions on Information Theory, vol. 48, No. 2, Feb. 2002; pp. 384-395.
Chen et al.; "MIMO Hybrid-ARQ Utilizing Lower Rate Retransmission over Mobile WiMAX System;" Mobile WiMAX Symposium, Jul. 9, 2009; pp. 129-134.
Wu, et al., "Space-Time Transmit Diversity with Antenna Hopping over Flat-fading Channels," The 14th IEEE 2003 International Symposium on Personal, Indoor and Mobile Radio Communication Proceedings, pp. 1312-1316.
Sawa, et al., "A Hybrid MIMO-OFDM System with Link Adaptation using both MIMO Techniques and Modulation Schemes," Institute of Electronics, Information, and Communication Engineers, NII—Electronic Library Service, vol. 104, No. 258, Aug. 8, 2004, pp. 97-102.
Otsuki, et al., "A Study on 4×2 MIMO-OFDM System with STBC," Institute of Electronics, Information, and Communication Engineers, NII—Electronic Library Service, vol. 105, No. 427, Nov. 11, 2005, pp. 27-31.
Wihandar, et al., "Two-stream MIMO-STBC Transmission Method using Dual-polarized Antennas," Institute of Electronics, Information, and Communication Engineers, NII—Electronic Library Service, vol. 105, No. 427, 2005, p. 242.
Xin, et al., "Space Time Schemes for STBC-Based MIMO Systems and Pre-FOE SIMO Systems," 2005 IEEE 16th International Symposium on Personal, Indoor and Mobile Radio Communications, pp. 1160-1164.
Ohtsuki, "MIMO and Space-Time Codes," Institute of Electronics, Information, and Communication Engineers, NII—Electronic Library Service, Dec. 8, 2003, vol. 103, No. 498, pp. 13-23.
Fujii, "Four-Branch Open-Loop Transmit Diversity Based on STBC Group-Coherent Codes for OFDM-CDM Systems," IEICE Trans. Commun., vol. 59*B, No. 1, Jan. 2006, pp. 231-234.

* cited by examiner

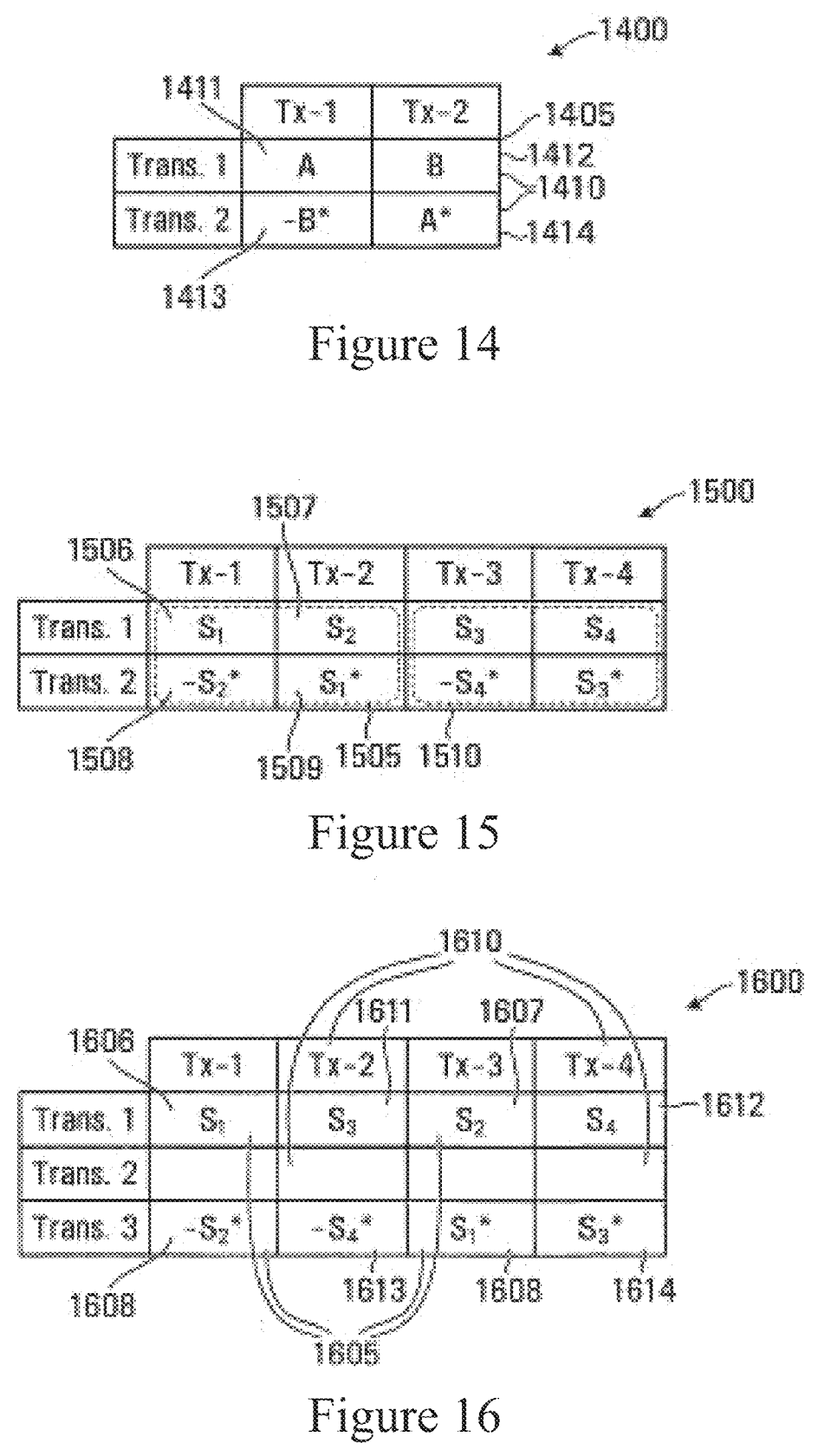

|            | Tx-1 | Tx-2 |
|------------|------|------|
| Trans. 1   | A    | B    |
| Trans. 2   | -B*  | A*   |

Figure 14

|          | Tx-1   | Tx-2   | Tx-3   | Tx-4   |
|----------|--------|--------|--------|--------|
| Trans. 1 | $S_1$  | $S_2$  | $S_3$  | $S_4$  |
| Trans. 2 | $-S_2^*$ | $S_1^*$ | $-S_4^*$ | $S_3^*$ |

Figure 15

|          | Tx-1   | Tx-2   | Tx-3   | Tx-4   |
|----------|--------|--------|--------|--------|
| Trans. 1 | $S_1$  | $S_3$  | $S_2$  | $S_4$  |
| Trans. 2 |        |        |        |        |
| Trans. 3 | $-S_2^*$ | $-S_4^*$ | $S_1^*$ | $S_3^*$ |

|  | Tx-1 | Tx-2 | Tx-3 | Tx-4 | Tx-5 | Tx-6 | Tx-7 | Tx-8 |
|---|---|---|---|---|---|---|---|---|
| Trans. 1 | $S_1$ | $S_2$ | $S_3$ | $S_4$ | $S_1$ | $S_2$ | $S_3$ | $S_4$ |
| Trans. 2 | $-S_2^*$ | $S_1^*$ | $-S_4^*$ | $S_3^*$ | $-S_2^*$ | $S_1^*$ | $-S_4^*$ | $S_3^*$ |
| Trans. 3 | $-S_3^*$ | $-S_4^*$ | $S_1$ | $S_2$ | $-S_3^*$ | $-S_4^*$ | $S_1$ | $S_2$ |
| Trans. 4 | $S_4$ | $-S_3$ | $-S_2^*$ | $S_1^*$ | $S_4$ | $-S_3$ | $-S_2^*$ | $S_1^*$ |
| Trans. 5 | $-S_1^*$ | $-S_2^*$ | $-S_3^*$ | $-S_4^*$ | $S_1$ | $S_2$ | $S_3$ | $S_4$ |
| Trans. 6 | $S_2$ | $-S_1$ | $S_4$ | $-S_3$ | $-S_2^*$ | $S_1^*$ | $-S_4^*$ | $S_3^*$ |
| Trans. 7 | $S_3$ | $S_4$ | $-S_1^*$ | $-S_2^*$ | $-S_3^*$ | $-S_4^*$ | $S_1$ | $S_2$ |
| Trans. 8 | $-S_4^*$ | $S_3^*$ | $S_2$ | $-S_1$ | $S_4$ | $-S_3$ | $-S_2^*$ | $S_1^*$ |

Figure 18

TRANSMISSION OF SYMBOLS IN A MIMO ENVIRONMENT USING ALAMOUTI BASED CODES

PRIORITY CLAIM

This application is a continuation of U.S. patent application Ser. No. 15/059,863, entitled "Transmission of Symbols in a MIMO Environment using Alamouti Based Codes", filed on Mar. 3, 2016, which is a continuation of U.S. patent application Ser. No. 13/944,240, of the same title, filed on Jul. 17, 2013, now U.S. Pat. No. 9,281,882, which is a continuation of U.S. patent application Ser. No. 12/874,001, of the same title, filed on Sep. 1, 2010, now U.S. Pat. No. 9,276,655, which is a continuation in part of U.S. patent application Ser. No. 13/068,840, entitled "Enhanced Method for Transmitting or Retransmitting Packets", filed on Sep. 2, 2009, now abandoned, which claims the benefit of priority from U.S. Provisional Patent Application No. 61/094,152, entitled "Enhanced Method for Transmitting or Retransmitting Packets", filed on Sep. 4, 2008, all of which are fully incorporated herein by reference for all purposes.

BACKGROUND

Field of the Application

This application relates to wireless communication techniques in general, and more specifically to symbol transmission in a MIMO scheme using Alamouti codes.

Background of the Disclosure

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

A known approach for efficiently delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation).

Space time transmit diversity (STTD) can achieve symbol level diversity which significantly improves link performance. STTD code is said to be 'perfect', therefore, in the sense that it achieves full space time coding rate (Space time coding rate=1, also called rate-1), and it is orthogonal. When the number of transmit antennas is more than 2, however, rate-1 orthogonal codes do not exist.

An approach to providing more efficient use of the channel bandwidth is to transmit the data using a base station having multiple antennas and then receive the transmitted data using a remote station having multiple receiving antennas, referred to as Multiple Input-Multiple Output (MIMO). MIMO technologies have been proposed for next generation wireless cellular systems, such as the third generation partnership project (3GPP) standards. Because multiple antennas are deployed in both transmitters and receivers, higher capacity or transmission rates can be achieved.

When using the MIMO systems to transmit packets, if a received packet has an error, the receiver may require re-transmission of the same packet. Systems are known that provide for packet symbols to be mapped differently than the original transmission.

Methods for transmitting symbols in a MIMO environment have been described in PCT International Patent Application no. PCT/CA2005/001976 bearing publication no. WO 2006/076787. This application is incorporated herein by reference.

In a closed loop system, the packet receiver can also indicate to the transmitter the best mapping of the re-transmit format.

In known systems, the possibility exists for certain symbol mappings to be ineffective in overcoming interference.

Thus a need exists for an improved ways to facilitate MIMO re-transmissions.

SUMMARY

In accordance with a first broad aspect is provided a method for transmitting data in a multiple-input-multiple-output space-time coded communication. The method comprises transmitting a plurality of sets of symbols over a common plurality of antennae and respective transmission resources according to a mapping table, the mapping table mapping a plurality of symbols defining the communication to respective antennae from amongst a plurality of transmission antennae and to at least one other transmission resource. The transmitting comprises transmitting symbols forming at least a part of a segment-level Alamouti code in the mapping table.

In accordance with a second broad aspect is provided a method for transmitting data in a multiple-input-multiple-output space-time coded communication. The method comprises defining a mapping table for mapping a plurality of symbols defining the communication to respective antennae from amongst a plurality of transmission antennae and to at least one other transmission resource. The method further comprises populating the mapping table by defining a plurality of primary segments of the mapping table, each of the plurality of primary segments comprising a plurality of components corresponding to individual symbol transmissions together defining a symbol-level Alamouti code; and defining a secondary segment of the mapping table, the secondary segment comprising a plurality of primary segments together defining a segment-level Alamouti code. The method further comprises transmitting the symbols in the mapping table with the plurality of antennae according to the mapping table.

Aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein:

FIG. 14 is a graphical illustration of a mapping table illustrating a symbol-level Alamouti code;

FIG. 15. is a graphical illustration of a mapping table illustrating two symbol-level Alamouti code;

FIG. 16 is a graphical illustration of a mapping table illustrating two symbol-level Alamouti code;

FIG. 17A is a graphical illustration of a mapping table illustrating a segment-level Alamouti code;

FIG. 17B is a graphical illustration of a mapping table illustrating a segment-level Alamouti code and symbol-level Alamouti codes;

FIG. 17C is a graphical illustration of a mapping table illustrating a segment-level Alamouti code and symbol-level Alamouti codes;

FIG. 18 is a graphical illustration of a mapping table illustrating two levels of segment-level Alamouti codes and symbol-level Alamouti codes;

Like reference numerals are used in different figures to denote similar elements.

DETAILED DESCRIPTION

Figure 1:
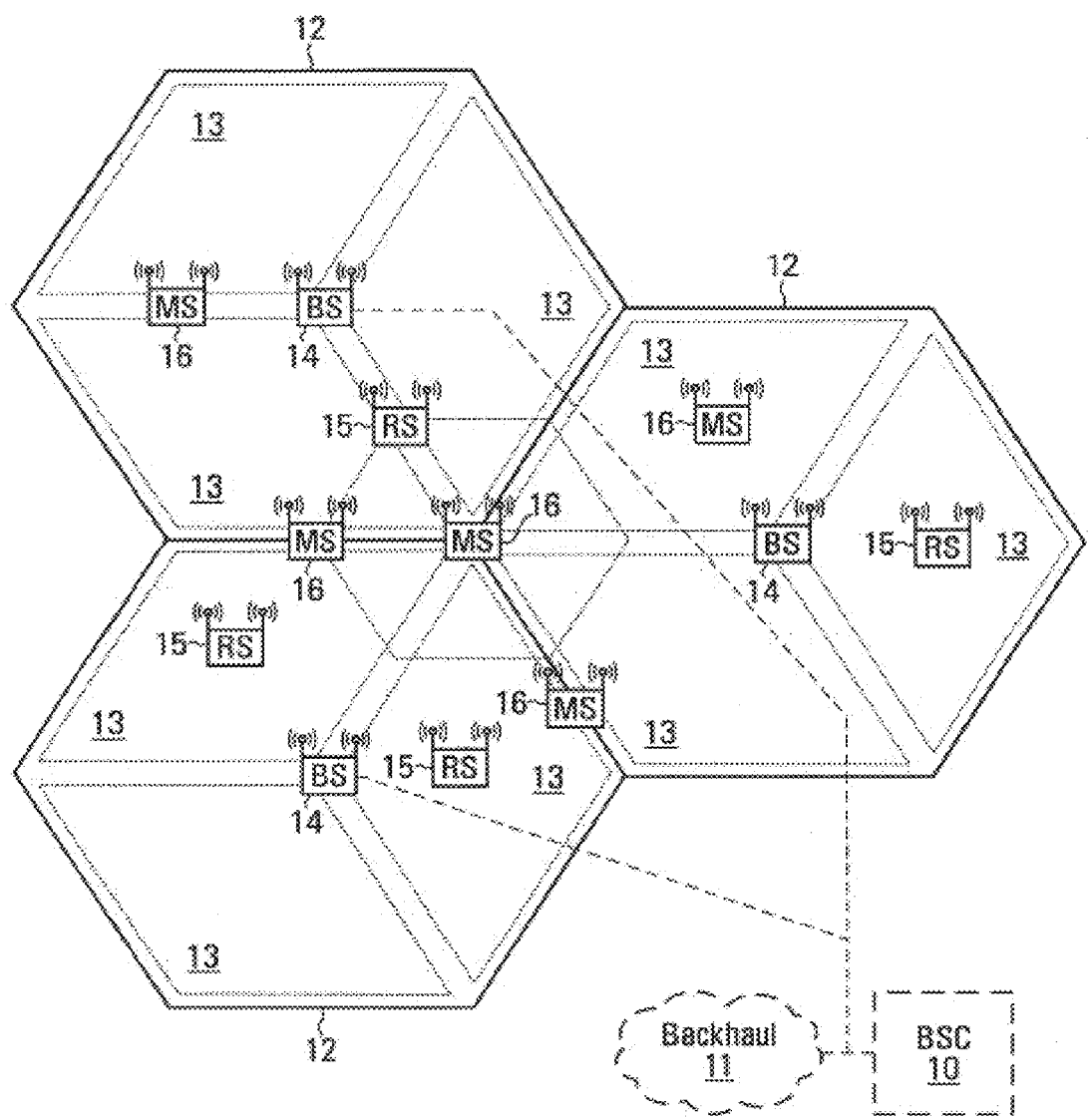
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each BS 14 facilitates communications using OFDM with subscriber stations (SS) 16 which can be any entity capable of communicating with the base station, and may include mobile and/or wireless terminals or fixed terminals, which are within the cell 12 associated with the corresponding BS 14. If SSs 16 moves in relation to the BSs 14, this movement results in significant fluctuation in channel conditions. As illustrated, the BSs 14 and SSs 16 may include multiple antennas to provide spatial diversity for communications. In some configurations, relay stations 15 may assist in communications between BSs 14 and wireless terminals 16. SS 16 can be handed off 18 from any cell 12, sector 13, zone (not shown), BS 14 or relay 15 to another cell 12, sector 13, zone (not shown), BS 14 or relay 15. In some configurations, BSs 14 communicate with each and with another network (such as a core network or the interne, both not shown) over a backhaul network 11. In some configurations, a base station controller 10 is not needed.

Figure 2:
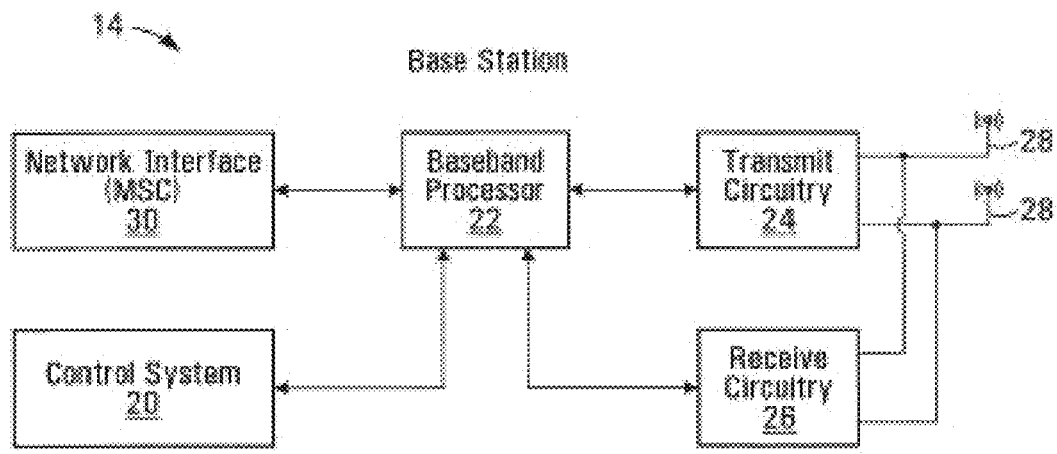
FIG. 2 is a block diagram of an example base station that might be used to implement some embodiments of the present 5 application.

With reference to FIG. 2, an example of a BS 14 is illustrated. The BS 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by SSs 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another SS 16 serviced by the BS 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
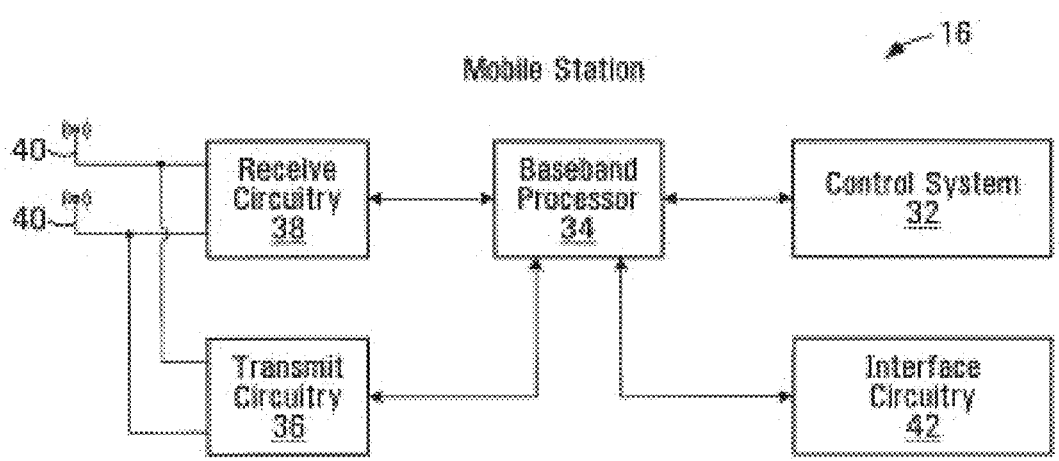
FIG. 3 is a block diagram of an example wireless terminal that might be used to implement some embodiments of the present application.

With reference to FIG. 3, an example of a subscriber station (SS) 16 is illustrated. SS 16 can be, for example a mobile station. Similarly to the BS 14, the SS 16 will include a control system 32, a baseband processor 34, transmit circuitry 36, receive circuitry 38, multiple antennas 40, and user interface circuitry 42. The receive circuitry 38 receives radio frequency signals bearing information from one or more BSs 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically Comprises demodulation, decoding, and error correction operations. The baseband processor 34 is generally implemented in one or more digital signal processors (DSPs) and application specific integrated circuits (ASICs). For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the SS and the base station, either directly or via the relay station.

In OFDM modulation, the transmission band is divided into multiple, orthogonal subcarriers. Each subcarrier is modulated according to the digital data to be transmitted. Because OFDM divides the transmission band into multiple subcarriers, the bandwidth per carrier decreases and the modulation time per carrier increases. Since the multiple subcarriers are transmitted in parallel, the transmission rate for the digital data, or symbols (discussed later), on any given subcarrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal subcarriers are generated for multiple bands within a transmission channel. The modulated signals are digital signals having a relatively low transmission rate and capable of staying within their respective bands. The individual subcarrier are not modulated directly by the digital signals. Instead, all subcarrier are modulated at once by IFFT processing.

In operation, OFDM is preferably used for at least downlink transmission from the BSs 14 to the SSs 16. Each BS 14 is equipped with "n" transmit antennas 28 (n>=1), and each SS 16 is equipped with "m" receive antennas 40 (m>=1). Notably, the respective antennas can be used for reception and transmission using appropriate duplexers or switches and are so labeled only for clarity.

When relay stations 15 are used, OFDM is preferably used for downlink transmission from the BSs 14 to the relays 15 and from relay stations 15 to the SSs 16.

Figure 4:
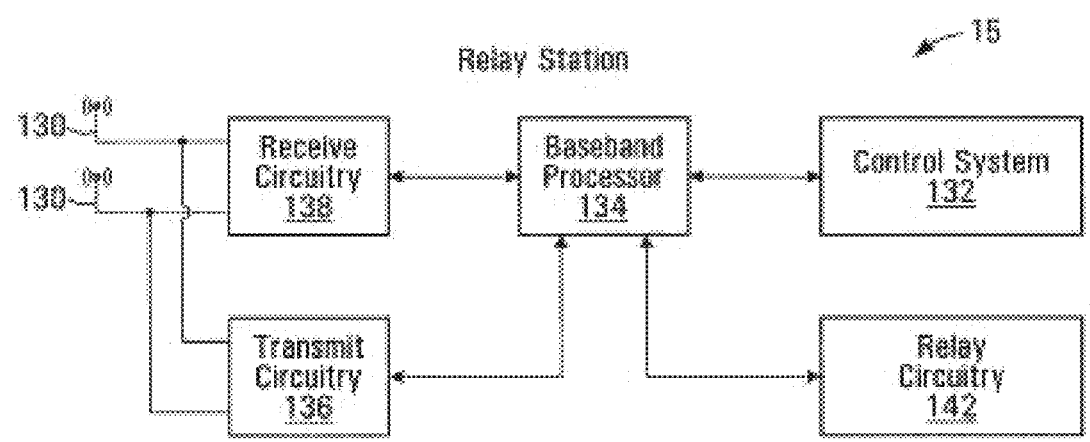
FIG. 4 is a block diagram of an example relay station that might be used to implement some embodiments of the present application.

With reference to FIG. 4, an example of a relay station 15 is illustrated. Similarly to the BS 14, and the SS 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 14 and SSs 16. The receive circuitry 138 receives radio frequency signals bearing information from one or more BSs 14 and SSs 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the SS and the base station, either directly or indirectly via a relay station, as described above.

Figure 5:
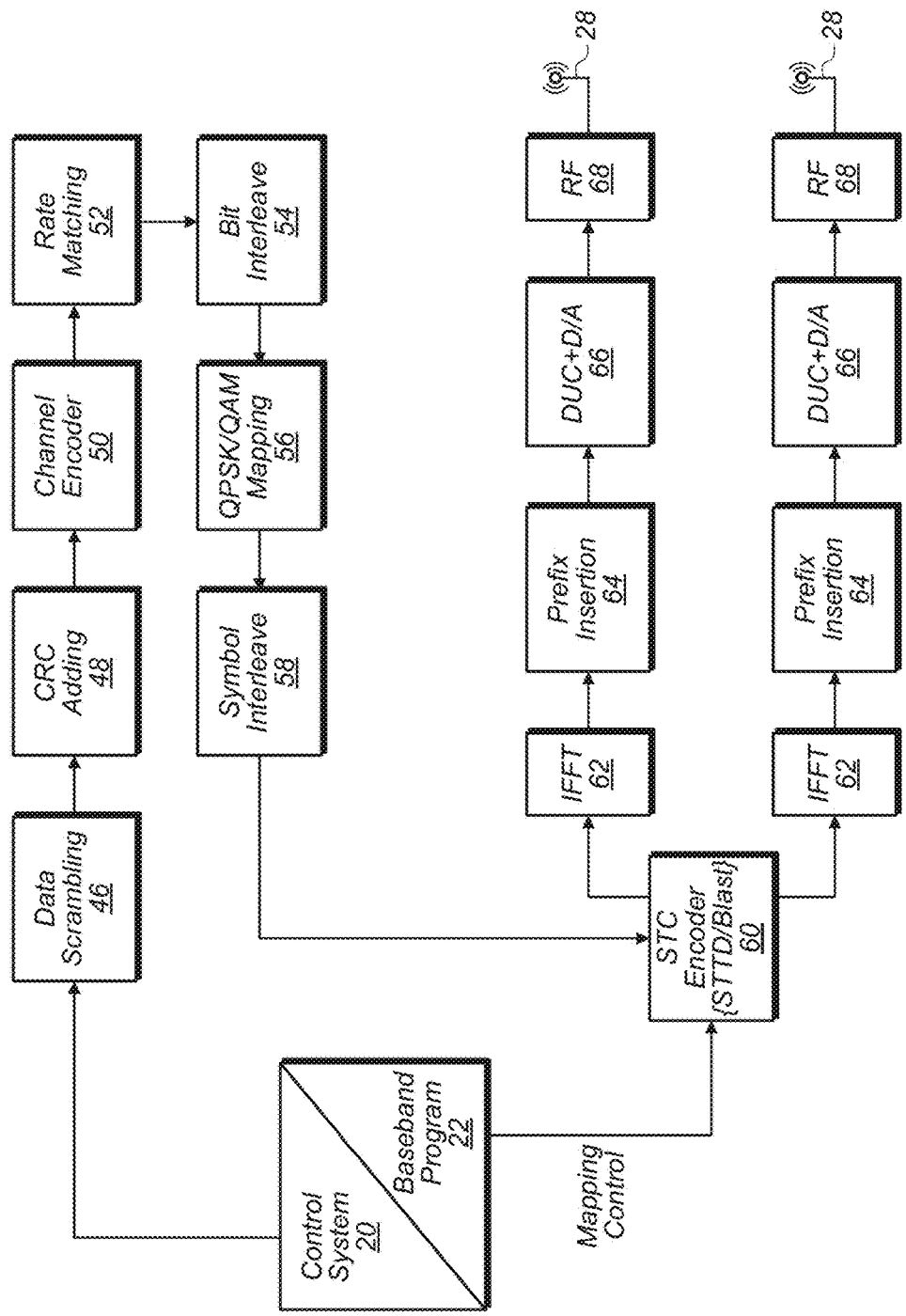
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various SSs 16 to the BS 14, either directly or with the assistance of a relay station 15. The BS 14 may use the information on the quality of channel associated with the SSs to schedule the data for transmission as well as select appropriate coding and modulation for transmitting the scheduled data. The quality of the channel is found using control signals, as described in more details below. Generally speaking, however, the quality of channel for each SS 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data may be determined and appended to the scrambled data using CRC adding logic 48. Next, channel coding is performed using channel encoder logic 50 to effectively add redundancy to the data to facilitate recovery and error correction at the SS 16. Again, the channel coding for a particular SS 16 may be based on the quality of channel. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the modulation scheme chosen by mapping logic 56. The modulation scheme may be, for example, Quadrature Amplitude Modulation (QAM), Quadrature Phase Shift Key (QPSK) or Differential Phase Shift Keying (DPSK) modulation. For transmission data, the degree of modulation may be chosen based on the quality of channel for the particular SS. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a SS 16. The STC encoder logic 60 will process the incoming symbols and provide "n" outputs corresponding to the number of transmit antennas 28 for the BS 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the SS 16.

For the present example, assume the BS 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended SS 16 are scattered among the sub-carriers. The SS 16 may use the pilot signals for channel estimation.

Figure 6:
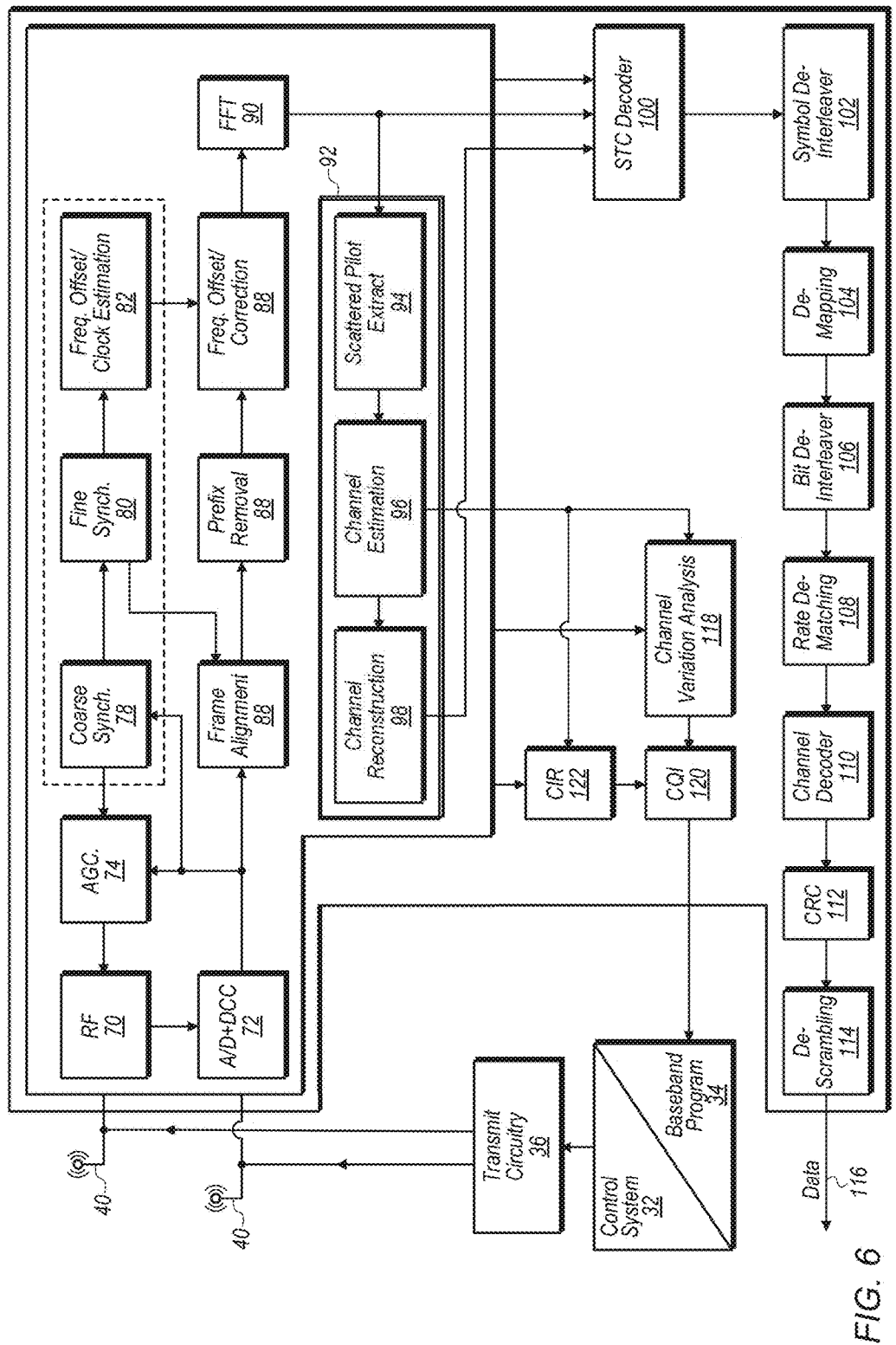
FIG. 6 is a block diagram of a logical breakdown of an example OFDM receiver architecture that might be used to implement some embodiments of the present application.

Reference is now made to FIG. 6 to illustrate reception of the transmitted signals by a SS 16, either directly from BS 14 or with the assistance of relay 15. Upon arrival of the transmitted signals at each of the antennas 40 of the SS 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level. Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI signal comprising an indication of channel quality, or at least information sufficient to derive some knowledge of channel quality at the BS 14, is determined and transmitted to the BS 14. transmission of the CQI signal will be described in more detail below. As noted above, the CQI may be a function of the carrier-to-interference ratio (CR), as well as the degree to which the channel response varies across the various sub-carriers in the OFDM frequency band. For example, the channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data. In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 7:
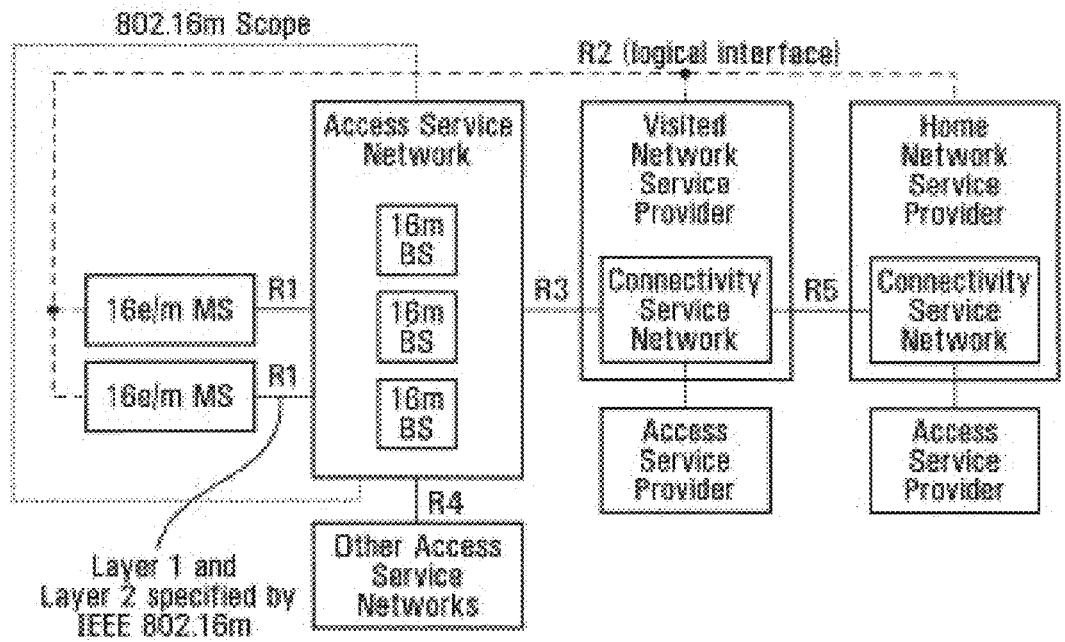
FIG. 7 is FIG. 1 of IEEE 802.16m-08/003rl, an Example of overall network architecture.

Turning now to FIG. 7, there is shown an example network reference model, which is a logical representation of a network that supports wireless communications among the aforementioned BSs 14, SSs 16 and relay stations (RSs) 15, in accordance with a non-limiting embodiment of the present invention. The network reference model identifies functional entities and reference points over which interoperability is achieved between these functional entities. Specifically, the network reference model can include an SS 16, an Access Service Network (ASN), and a Connectivity Service Network (CSN).

The ASN can be defined as a complete set of network functions needed to provide radio access to a subscriber (e.g., an IEEE 802.16e/m subscriber). The ASN can comprise network elements such as one or more BSs 14, and one or more ASN gateways. An ASN may be shared by more than one CSN. The ASN can provide the following functions:

Layer-1 and Layer-2 connectivity with the SS 16;
Transfer of AAA messages to subscriber's Home Network Service Provider (H-NSP) for authentication, authorization and session accounting for subscriber sessions;
Network discovery and selection of the subscriber's preferred NSP;
Relay functionality for establishing Layer-3 (L3) connectivity with the SS 16 (e.g., IP address allocation); and
Radio resource management.

In addition to the above functions, for a portable and mobile environment, an ASN can further support the following functions:

ASN anchored mobility;
CSN anchored mobility;
Paging; and
ASN-CSN tunneling.

For its part, the CSN can be defined as a set of network functions that provide IP connectivity services to the subscriber. A CSN may provide the following functions:

MS IP address and endpoint parameter allocation for user sessions;
AAA proxy or server;
Policy and Admission Control based on user subscription profiles;
ASN-CSN tunneling support;
Subscriber billing and inter-operator settlement;
Inter-CSN tunneling for roaming; and
Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
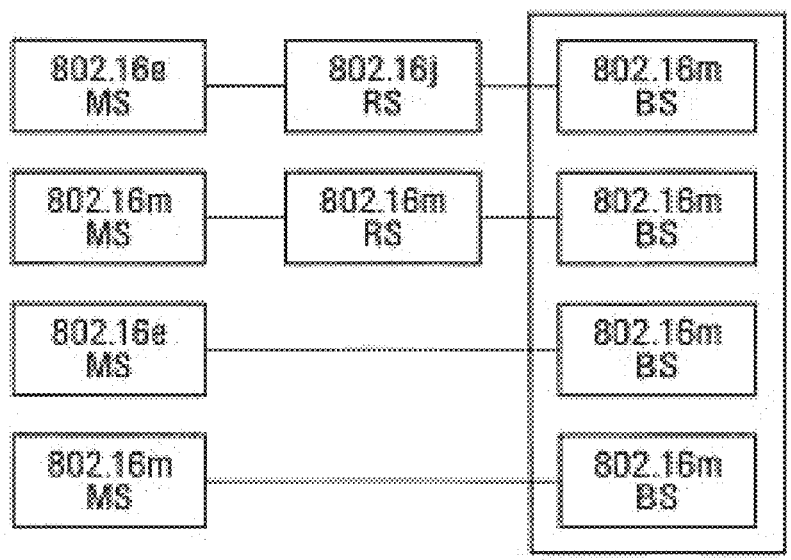
FIG. 8 is FIG. 2 of IEEE 802.16m-08/003rl, a Relay Station in overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
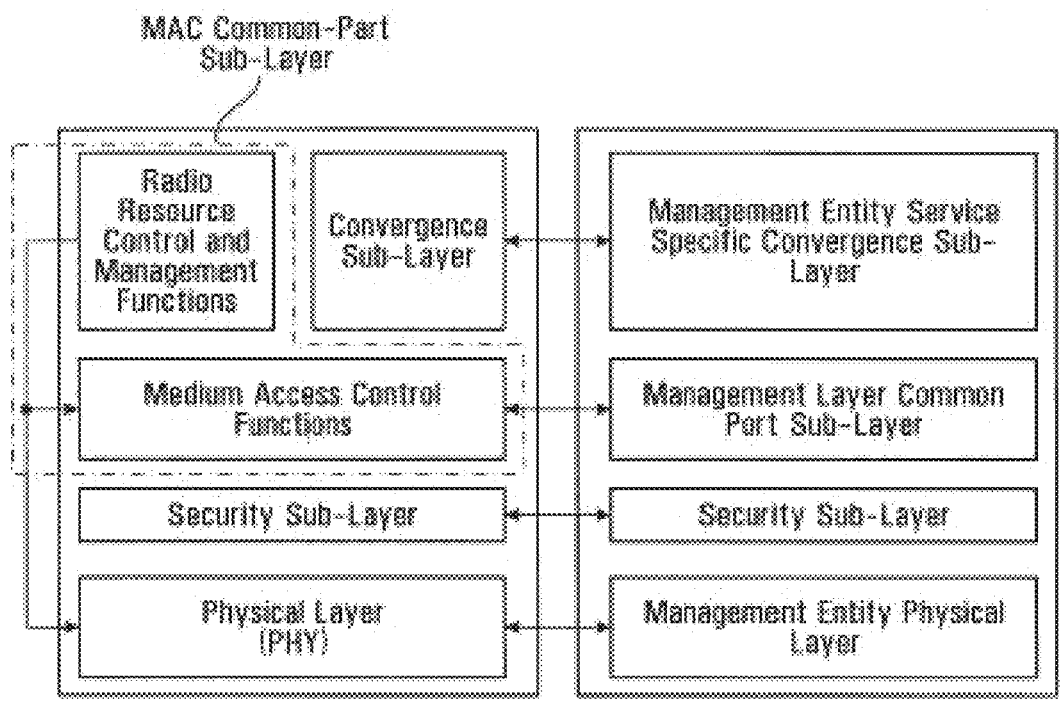
FIG. 9 is FIG. 3 of IEEE 802.16m-08/003rl, a System Reference Model.

With reference now to FIG. 9, there is shown a system reference model, which applies to both the SS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the SS 16 and associating varying levels of QoS, data communications are carried out in the context of "connections". In particular, "service flows" may be provisioned when the SS 16 is installed in the system. Shortly after registration of the SS 16, connections are associated with these service flows (one connection per service flow) to provide a reference against which to request bandwidth.

Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the SS 16 requests uplink bandwidth on a per connection basis (implicitly identifying the service flow). Bandwidth can be granted by the BS to a MS as an aggregate of grants in response to per connection requests from the MS.

Figure 10:
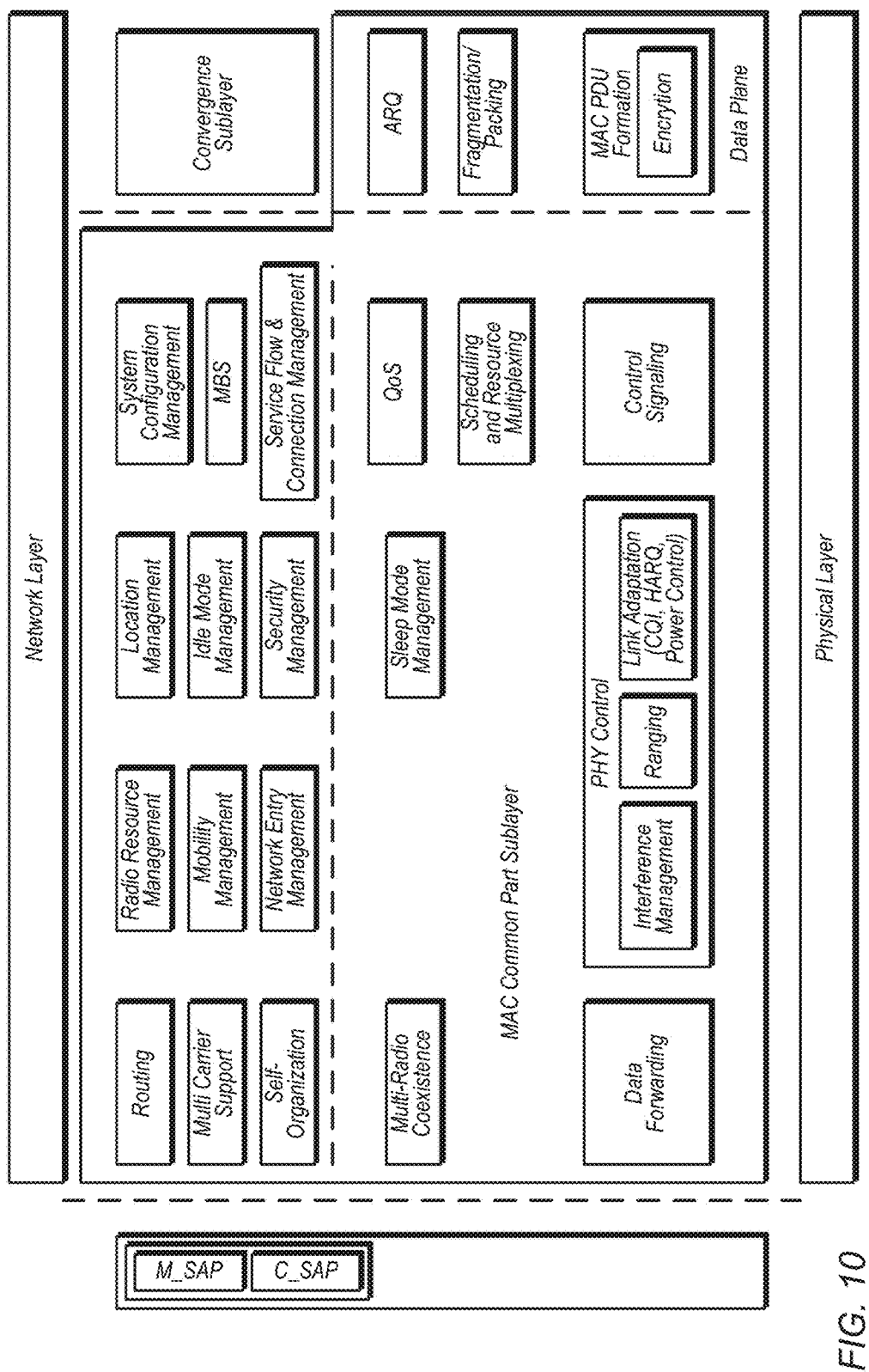
FIG. 10 is FIG. 4 of IEEE 802.16m-08/003rl, The IEEE 802.16m Protocol Structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:

Radio Resource Management
Mobility Management
Network Entry Management
Location Management
Idle Mode Management
Security Management
System Configuration Management
MBS (Multicast and Broadcasting Service)
Service Flow and Connection Management Relay functions
Self-Organization
Multi-Carrier
Radio Resource Management
　　The Radio Resource Management block adjusts radio network parameters based on traffic load, and also includes function of load control (load balancing), admission control and interference control.
Mobility Management
　　The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.
Network Entry Management
　　The Network Entry Management block is in charge of initialization and access procedures. The Network Entry Management block may generate management messages which are needed during access procedures, i.e., ranging, basic capability negotiation, registration, and so on.
Location Management
　　The Location Management block is in charge of supporting location based service (LBS). The Location Management block may generate messages including the LBS information.
Idle Mode Management
　　The Idle Mode Management block manages location update operation during idle mode. The Idle Mode Management block controls idle mode operation, and generates the paging advertisement message based on paging message from paging controller in the core network side.
Security Management
　　The Security Management block is in charge of authentication/authorization and key management for secure communication.
System Configuration Management
　　The System Configuration Management block manages system configuration parameters, and system parameters and system configuration information for transmission to the MS.
MBS (Multicast and Broadcasting Service)
　　The MBS (Multicast Broadcast Service) block controls management messages and data associated with broadcasting and/or multicasting service.
Service Flow and Connection Management
　　The Service Flow and Connection Management block allocates "MS identifiers" (or station identifiers—STIDs) and "flow identifiers" (FIDs) during access/handover/service flow creation procedures. The MS identifiers and FIDs will be discussed further below.
Relay Functions
　　The Relay Functions block includes functions to support multi-hop relay mechanisms. The functions include procedures to maintain relay paths between BS and an access RS.
Self-Organization
　　The Self Organization block performs functions to support self-configuration and self-optimization mechanisms. The functions include procedures to request RSs/MSs to report measurements for self-configuration and self-optimization and receive the measurements from the RSs/MSs.
Multi-Carrier
　　The Multi-carrier (MC) block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. FDD, TDD, or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:
　　PHY Control
　　Control Signaling
　　Sleep Mode Management
　　QoS
　　Scheduling and Resource Multiplexing
　　ARQ
　　Fragmentation/Packing
　　MAC PDU formation
　　Multi-Radio Coexistence
　　Data forwarding
　　Interference Management
　　Inter-BS coordination
　　PHY Control
　　The PHY Control block handles PHY signaling such as ranging, measurement/feedback (CQI), and HARQ ACK/NACK. Based on CQI and HARQ ACKNACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.
Control Signaling
　　The Control Signaling block generates resource allocation messages.
Sleep Mode Management
　　Sleep Mode Management block handles sleep mode operation. The Sleep Mode Management block may also generate MAC signaling related to sleep operation, and may communicate with Scheduling and Resource Multiplexing block in order to operate properly according to sleep period.
QoS
　　The QoS block handles QoS management based on QoS parameters input from the Service Flow and Connection Management block for each connection.
Scheduling and Resource Multiplexing
　　The Scheduling and Resource Multiplexing block schedules and multiplexes packets based on properties of connections. In order to reflect properties of connections Scheduling and Resource Multiplexing block receives QoS information from The QoS block for each connection.
ARQ
　　The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).
Fragmentation/Packing
　　The Fragmentation/Packing block performs fragmenting or packing MSDUs based on scheduling results from Scheduling and Resource Multiplexing block.
MAC PDU Formation
　　The MAC PDU formation block constructs MAC PDU so that B S/MS can transmit user traffic or management messages into PHY channel. MAC PDU formation block adds MAC header and may add sub-headers.
Multi-Radio Coexistence The Multi-Radio Coexistence block performs functions to support concurrent operations of IEEE 802.16m and non-IEEE 802.16m radios collocated on the same mobile station.

Data Forwarding

The Data Forwarding block performs forwarding functions when RSs are present on the path between BS and MS. The Data Forwarding block may cooperate with other blocks such as Scheduling and Resource Multiplexing block and MAC PDU formation block.

Interference Management

The Interference Management block performs functions to manage the inter-cell/sector interference. The operations may include:

MAC layer operation

Interference measurement/assessment report sent via MAC signaling

Interference mitigation by scheduling and flexible frequency reuse

PHY layer operation

Transmit power control

Interference randomization

Interference cancellation

Interference measurement

Tx beamforming/precoding

Inter-BS Coordination

The Inter-BS coordination block performs functions to coordinate the actions of multiple BSs by exchanging information, e.g., interference management. The functions include procedures to exchange information for e.g., interference management between the BSs by backbone signaling and by MS MAC messaging. The information may include interference characteristics, e.g. interference measurement results, etc.

Figure 11:
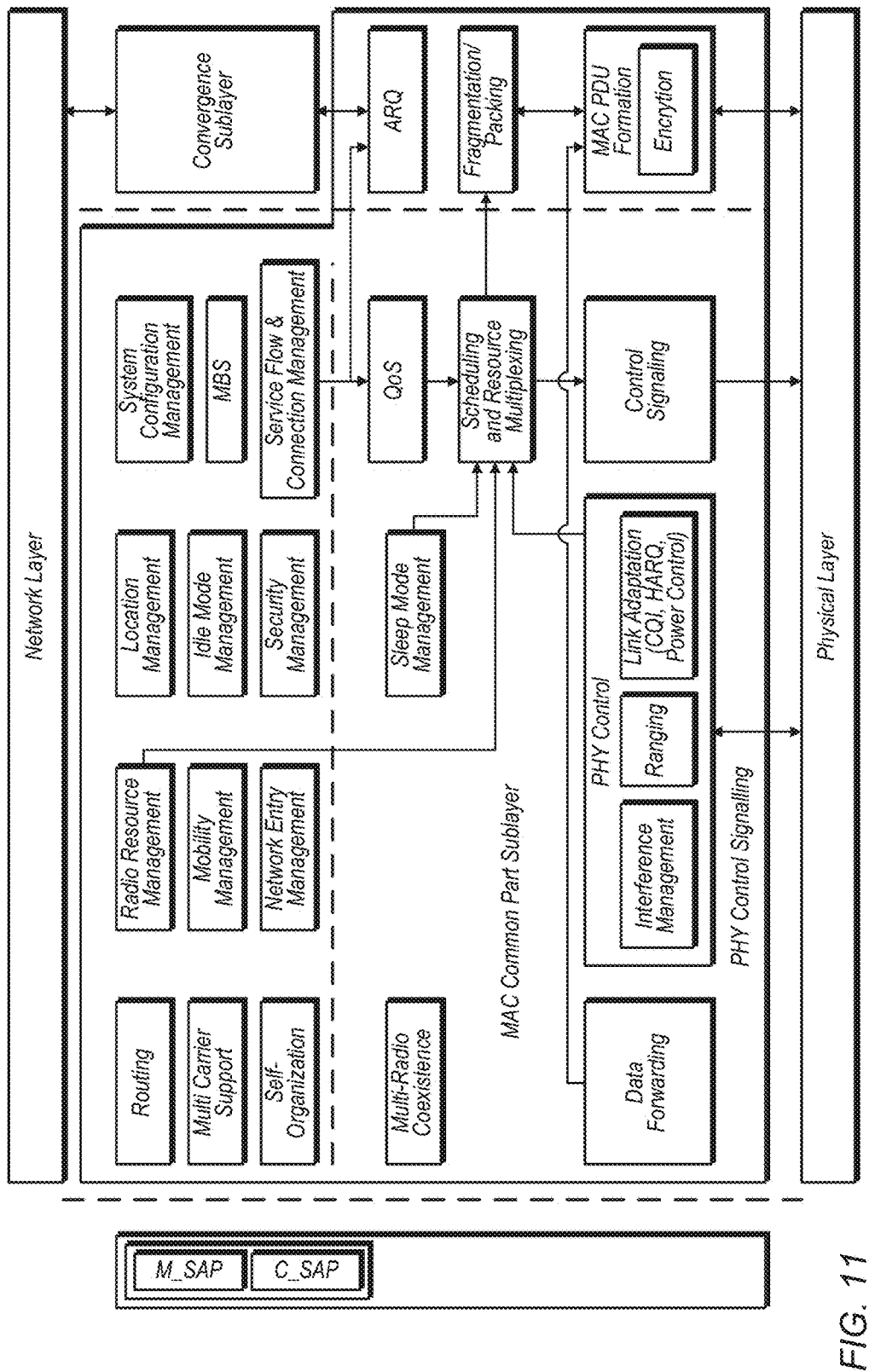
FIG. 11 is FIG. 5 of IEEE 802.16m-08/003rl, The IEEE 802.16m MS/BS Data Plane Processing Flow.

Reference is now made to FIG. 11, which shows the user traffic data flow and processing at the BS 14 and the SS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
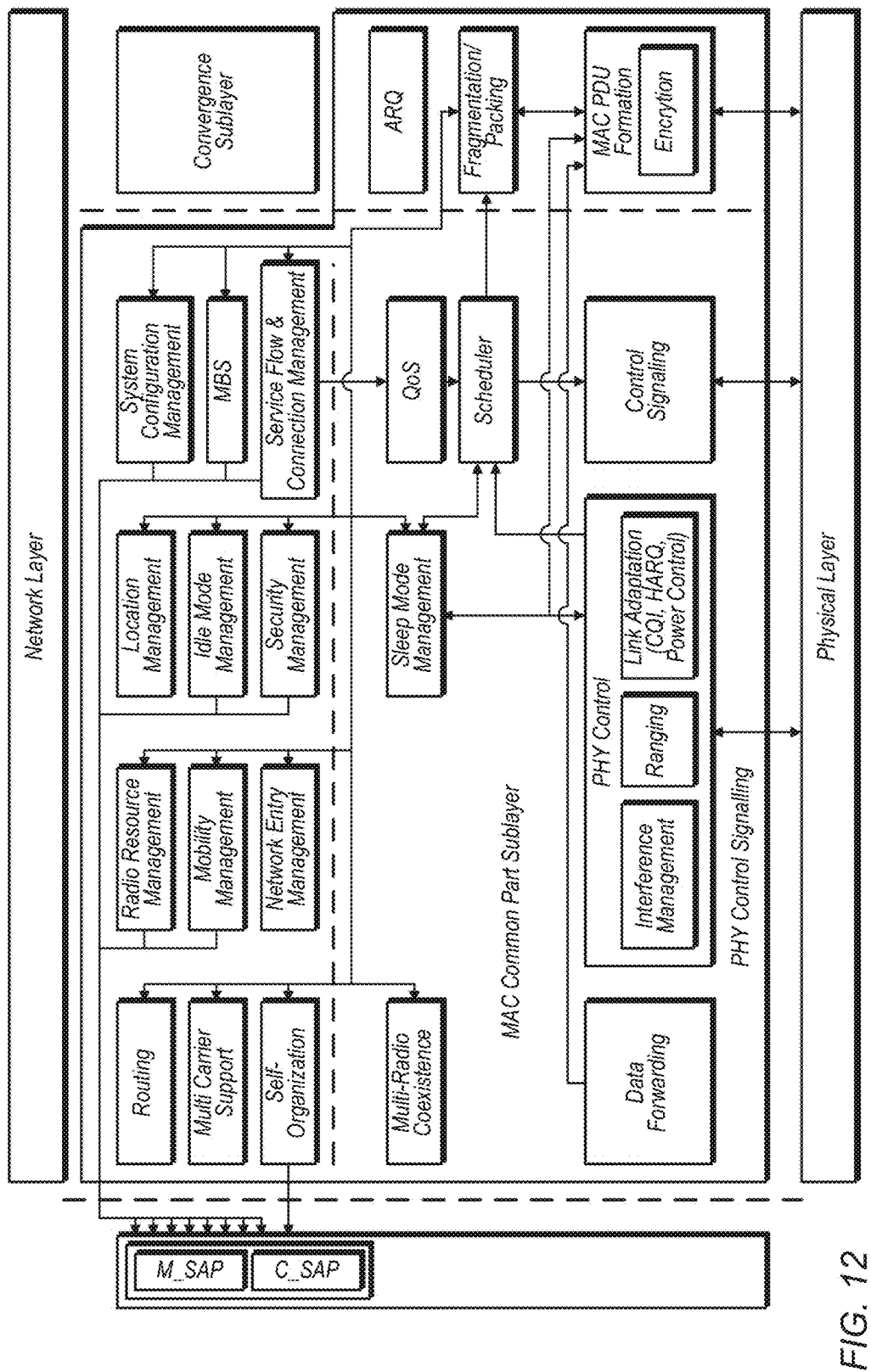
FIG. 12 is FIG. 6 of IEEE 802.16m-08/003rl, The IEEE 802.16m MS/BS Control Plane Processing Flow.

Reference is now made to FIG. 12, which shows the CPS control plane signaling flow and processing at the BS 16 and the MS 14. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M SAP/C SAP and MAC functional blocks show the control and management primitives to/from Network Control and Management System (NCMS). The primitives to/from M SAP/C SAP define the network involved functionalities such as inter-BS interference management, inter/intra RAT mobility management, etc. and management related functionalities such as location management, system configuration etc.

Figure 13:
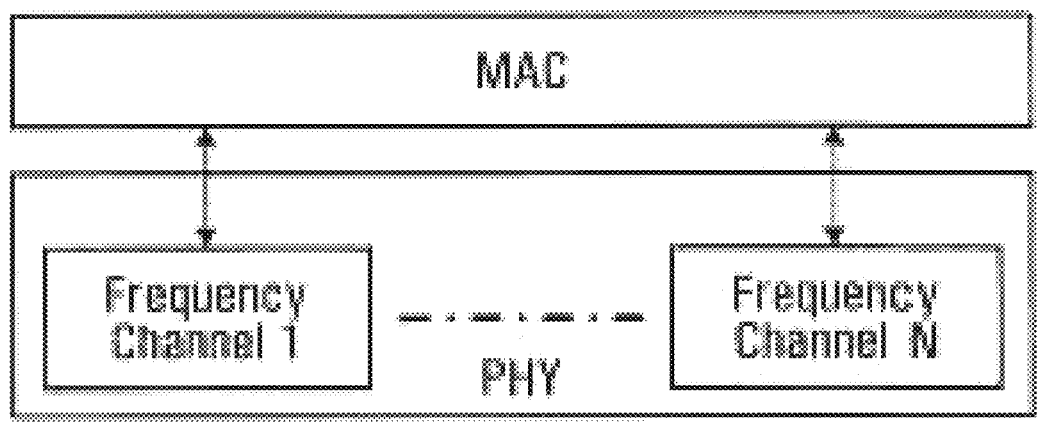
FIG. 13 is FIG. 7 of IEEE 802.16m-08/003rl, Generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

Embodiments of the present invention are described with reference to a MIMO communication system. The MIMO communication system may implement packet re-transmission schemes which may be for use in accordance with the IEEE 802.16(e) and IEEE 802.11 (n) standards. The packet re-transmission schemes described below may be applicable to other wireless environments, such as, but not limited to, those operating in accordance with the third generation partnership project (3GPP) and 3GPP2 standards.

In the following description, the term 'STC code mapping' is used to denote a mapping of symbols to antennas. Each symbol in such a mapping may be replaced by its conjugate (e.g. S1*), or a rotation (e.g. jS1, -S1 and -jS1), or a combination of its conjugate and a rotation (e.g. jS1*). In some embodiments, the mapping also includes a signal weighting for each antenna.

Alamouti codes may be used for STC code mappings. FIG. 14 illustrates the coding matrix 1400 for an Alamouti code.

Tx-1 and Tx-2 in FIG. 14 represent a first and second transmit antenna, respectively. Generally, Alamouti code requires two antennas at the transmitter and provides maximal transmit diversity gain for two antennas. Two antennae Tx-1 and Tx-2 are represented in FIG. 14, each by a respective column. This traditional four-symbol Alamouti code may be considered a symbol-level Alamouti code.

Trans. 1 and Trans. 2 in FIG. 14 represent a first and second transmission resource, respectively, over which a single symbol is transmitted per antenna. Each transmission resource Trans. I is associated with a set of symbols defined in the transmission resource Trans. i's row. The two transmissions Trans. 1 and Trans. 2 in FIG. 14 are represented by respective rows. The transmission resources over which symbols are sent may be defined in any suitable manner, although generally each antenna will transmit one symbol per transmission resource Trans. i. For example, the different transmission resources Trans. 1, Trans. 2, etc. . . . may represent different time intervals. In such a case, according to FIG. 14, antenna Tx-1 transmits symbol A at a first time interval Trans. 1, while antenna Tx-2 transmits symbol B, in the same time interval Trans. 1. At a subsequent time interval Trans. 2, antenna Tx-1 transmits symbol -B2*, while in the same time interval Trans. 2, antenna Tx-2 transmits symbol A1*.

Thus, a transmission resource Trans. i may represent a unit of time. In other examples, however, a transmission resource Trans. i may refer to other physical or logical properties allowing to distinguish separate occurrences of symbols. For example, the transmission resources Trans. i to which the individual symbols are mapped in the mapping table may represent separate subcarriers, spreading sequences, OFDM intervals, or suitable combinations thereof. Indeed, any suitable mode of separating transmissions may be used.

The cells in the table each lie at the intersections of a row and a column and represent individual transmissions of symbols on individual antennae. The mapping table 1400, with two columns and two rows forms a square segment 1405 having four components 1411, 1412, 1413, 1414, each of which is a single cell in the mapping table 1400 and corresponding to one symbol. Together the four components form an Alamouti code. In this example, components 1411, 1412, 1413, 1414 are quadrants of the square-shaped segment 1405. It will be understood that in accordance with a notation whereby a star "*" indicates a conjugate, A* represents the conjugate of A, whereas -B* represents the negative conjugate of B.

In some cases, one or more transmission may occur within the same symbol or frame and/or may be part of the same HARQ packet transmission. In other cases, each transmission may correspond to a separate HARQ transmission.

A scheme for use in re-transmitting a MIMO packet using four transmit antennas, and using two such mappings, derived from Alamouti code, is shown in FIG. 15 which illustrates a mapping table 1500 showing symbol mapping for a transmission scheme whereby four symbols are transmitter over four antennae and two transmissions. As shown in FIG. 15, the first and a second re-transmission of a MIMO packet take place using 'double STTD' STC code mappings.

More specifically, the mapping table may be divided into two segments 1505, 1510, each having four components, each component being single-symbol components. Each of the segments 1505 and 1510 defines an Alamouti coding. In FIG. 15, a first segment 1505 lies at the conjunction of antennae Tx-1, Tx-2 and Transmissions Trans. 1 and Trans. 2. The first segment 1505 comprises four components 1506, 1507, 1508, 1509, each corresponding to one symbol. In those four components, 1506, 1507, 1508, 1509 the mapping takes the form of an Alamouti code in a manner similar as in the mapping table 1400. In the second segment 1510 at the conjunction of Tx-3, Tx-4 and Trans. 1, Trans. 2, four components likewise correspond to symbols and take the form of an Alamouti code in a manner similar to that shown in FIG. 14.

Although the segments shown in FIG. 15 are contiguous, it should be understood that this needs not be the case. Indeed, the four components of the segments may be arranged in a non-adjacent manner in the mapping table 1500. For example, segments 1505 and 1510 could be horizontally discontinuous and being on non-adjacent antennae (in the table representation or in physical reality) as shown in FIG. 16. In the mapping table 1600 shown in FIG. 16, a similar arrangement as in FIG. 15, but with the segments split over non-adjacent antenna columns. Here, components 1606, 1608, corresponding to antenna Tx-1 and components 1607 and 1609 of antenna Tx-3 belong to a first segment 1605, while components 1611 and 1613 corresponding to antenna Tx-2 and components 1612 and 1614 of antenna Tx-4 belong to a second segment 1610. Furthermore, segments 1605 and 1610 are discontinuous in the transmission resource direction as well. More specifically, in the case of first segment 1605, components 1606 and 1607 correspond to transmission resource Trans. 1 while 1608 and 1609 correspond to transmission resource Trans. 3, while no component of the first segment 1605 occur at transmission resources Trans. 2. Similarly for the second segment 1610, components 1611 and 1612 correspond to transmission resource Trans. 1 while 1613 and 1614 correspond to transmission resource Trans. 3, while no component of the first segment 1605 occur at transmission resources Trans. 2.

In an alternative example, the various symbols S1, S2, S3, S4 could also be located not on the same transmission Trans. 1, but may be spread among different transmissions. Likewise their respective conjugate or negative could likewise not all be located on the same transmissions Trans. 3. In such a case, the symbols S1, S2, S3, S4 should be on different transmissions and antennae Trans. i as their conjugates or negative conjugates to ensure transmission (e.g. time) and space diversity.

In accordance with the mapping table 1500 shown in FIG. 15, beyond the first retransmission, the two STC code mappings defined in Table 1 may be used alternately to re-transmit until the data packet is successfully decoded at the receiver. For example, symbols S1, S2, S3, S4 may contain (possibly amongst other information) HARQ re-transmissions.

Figures 17A, 17B, 17C:
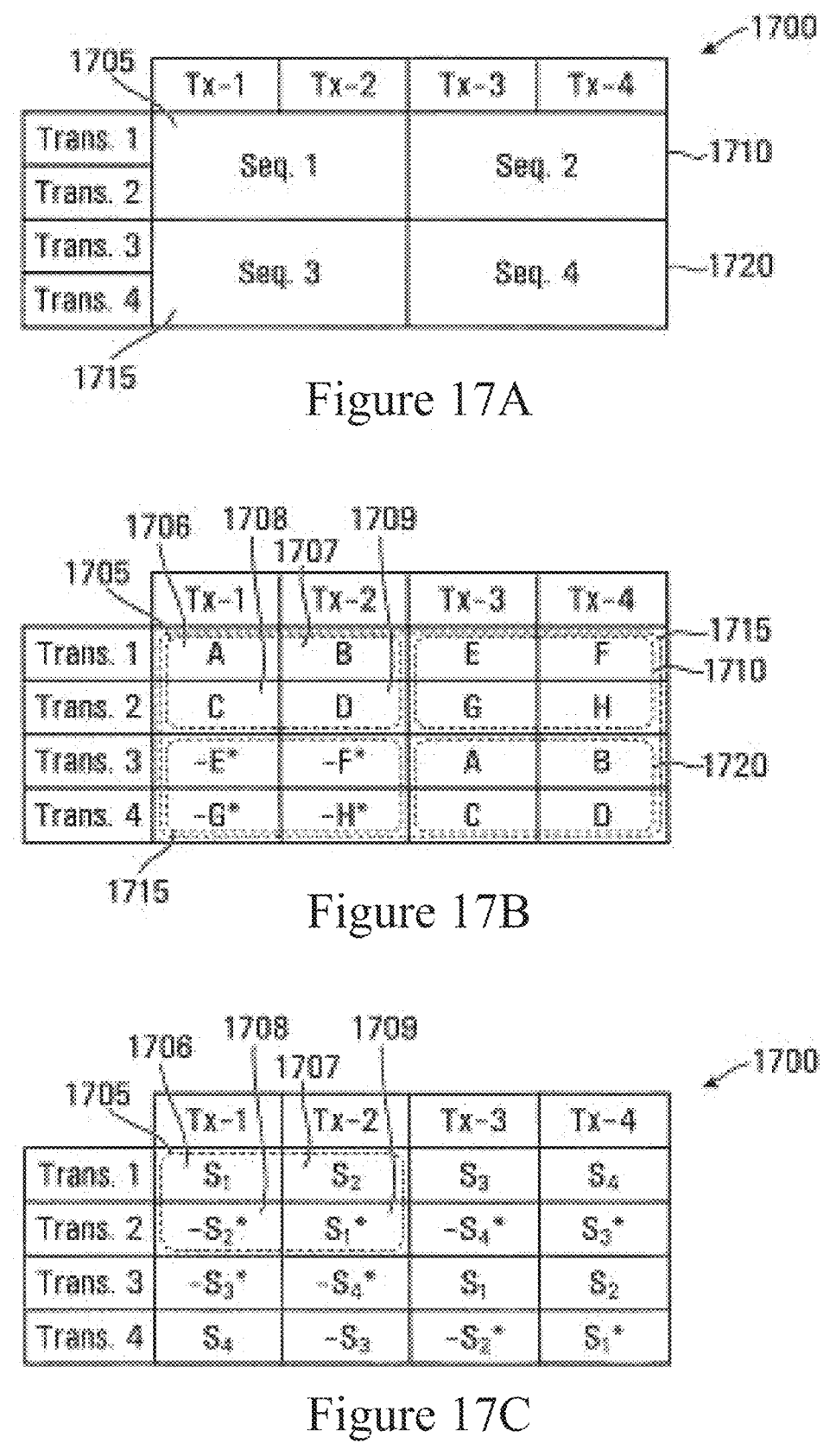

FIG. 17A shows a mapping table 1700 divided into four segments 1705, 1710, 1715, 1720 which in this example are four quadrants of four cells (individual cells not shown). As will be described in more detail below, each segment 1705, 1710, 1715, 1720 are populated with symbols following the Alamouti code pattern, but applied at a per-segment level.

FIG. 17B shows the mapping table 1700 with the contents of each segment 1705, 1710, 1715, 1720 shown. As shown, each segment 1705, 1710, 1715, 1720 comprises four components. For example, segment 1705 comprises four single-symbol components 1706, 1707, 1708 and 1709.

The segments 1705, 1710, 1715, 1720 together can be considered to make up a larger segment 1725. To distinguish between the smaller segments 1705, 1710, 1715, 1720 and the larger segment 1725 which is made up of smaller segments, the segments 1705, 1710, 1715, 1720 may be referred to as primary segments while the segment 1725 may be referred to as a secondary segment. In this example, secondary segment 1725 makes up the entire contents of the mapping table 1700, however in other examples, there may be several secondary segments, each being comprised of primary segments.

The secondary segment 1725 is made up of four sub-segments, which in this case are primary segments 1705, 1710, 1715, 1720. These are multi-symbol components of the secondary segment 1725. In this example, the primary segments 1705, 1710, 1715, 1720 are quadrants of the secondary segment 1725. The mapping table 1700 is populated with symbols. (For simplicity, the symbols are represented here as A, B, C, D, E, F, G, H, and negative conjugates thereof. However, a more specific description of the symbols in each primary segment will be provided further below, with reference to FIG. 17C where the placeholder labels A, B, C, . . . have been replaced with more specific symbol labels.) More specifically, the mapping table 1700 is populated in such as manner as to form a segment-level Alamouti code of the primary segments 1705, 1710, 1715, 1720. Any suitable manner of applying the pattern of the Alamouti code to segments may be used to derive a pattern for a segment-level Alamouti code. In this example, the pattern of the segment-level Alamouti code is such that the symbols of the primary segment 1715 are the negative conjugates of the symbols of the primary segment 1710 while the symbols of the primary segment 1720 are the same as that of the primary segment 1705.

In this example, the Alamouti code is implemented on a segment-level by ensuring that the symbols in the secondary segment 1725 follow a certain pattern. It should be understood that other patterns derived from the Alamouti code could also be used. For example, rather than to replicate the primary segment 1705, the symbols of primary segment 1720 could be conjugates of the symbols of primary segment 1705. Alternatively, the symbols of some primary segments may represent the result of matrix operations on other primary segments such as transpose operations conjugate transpose or other transformations. It should also be understood that the location of conjugates or negative conjugates relative to their basis could be inversed. It is to be understood that any Alamouti based code, based on the Alamouti pattern may be used both at the symbol and segment levels.

For the purpose of describing the relationship between primary segments 1705, 1710, 1715, 1720, their symbols have been represented as A, B, C, D, E, F, G, H and negative conjugates thereof. However, the actual contents of each primary segment 1705, 1710, 1715, 1720 may itself follow the pattern of the Alamouti code, as shown in FIG. 17C. In FIG. 17C, labels A, B, C, D, E, F, G, H have been replaced with S1, S2, S3, S4, S5, S6, S7 and S8, respectively. As shown, the primary segments 1705, 1710, 1715, 1720 may make up Alamouti codes. For example, primary segment 1705 comprises S1 in component 1706, S2 in component 1707, -S2* in component 1708 and S1* in component 1709, thus forming an Alamouti code. It will be appreciated that the Alamouti code pattern is also present in the other primary segments.

Thus, secondary segment 1725, which defines a segment-level Alamouti code, comprises sub-segments which themselves define Alamouti codes. This results in a pattern of nested Alamouti codes.

It will be appreciated that the symbols in the mapping table 1700 thus form part of symbol-level Alamouti codes (defined in segments 1705, 1710, 1715 and 1720) and segment-level Alamouti codes (defined in segment 1725) and that at the segment level, we start to deviate from the symbol level Alamouti scheme.

Thus the mapping table 1700 can be used for a reliable transmission of four symbols S1, S2, S3, S4. The transmission scheme defined by the mapping table 1700 can be used in any suitable way to transmit symbols S1, S2, S3, S4. For example, each transmission resource Trans. 1, Trans. 2, Trans. 3, Trans. 4 may be considered a separate transmission which may or may not necessarily occur. For example, if transmission resources Trans. 1, Trans. 2, Trans. 3, Trans. 4 are separate time intervals, a scheme for transmitting symbols S1, S2, S3 and S4 may involve successively undergoing all four transmissions shown in FIG. 17C at their respective times.

Alternatively, the mapping table 17C may be used as a retransmission scheme to be followed in the event of a failed transmission. In such a case, a first transmission may occur using transmission resource Trans. 1. If the transmission is successful, the remaining transmission indicated in the mapping table may not occur at all. If the first transmission is not successful, or if it is not possible to confirm that it was successful, a second transmission may take place following the mapping for transmission resource Trans. 2. This may also be done several transmissions at a time, whereby several transmissions over several transmission resources take place according to the mapping table, and only if these several transmissions are not successful are additional transmissions over additional transmission resources performed according to the mapping table. This pattern may repeat itself until a transmission is successful or until the bottom of the table is reached, at which point further attempts can be made by starting again from the top of the table or the transmission may be determined to be a failure. Since the transmission resource can be a resource other than time, it is possible that subsequent transmissions/retransmissions occur in another frame or frames.

Figure 20:
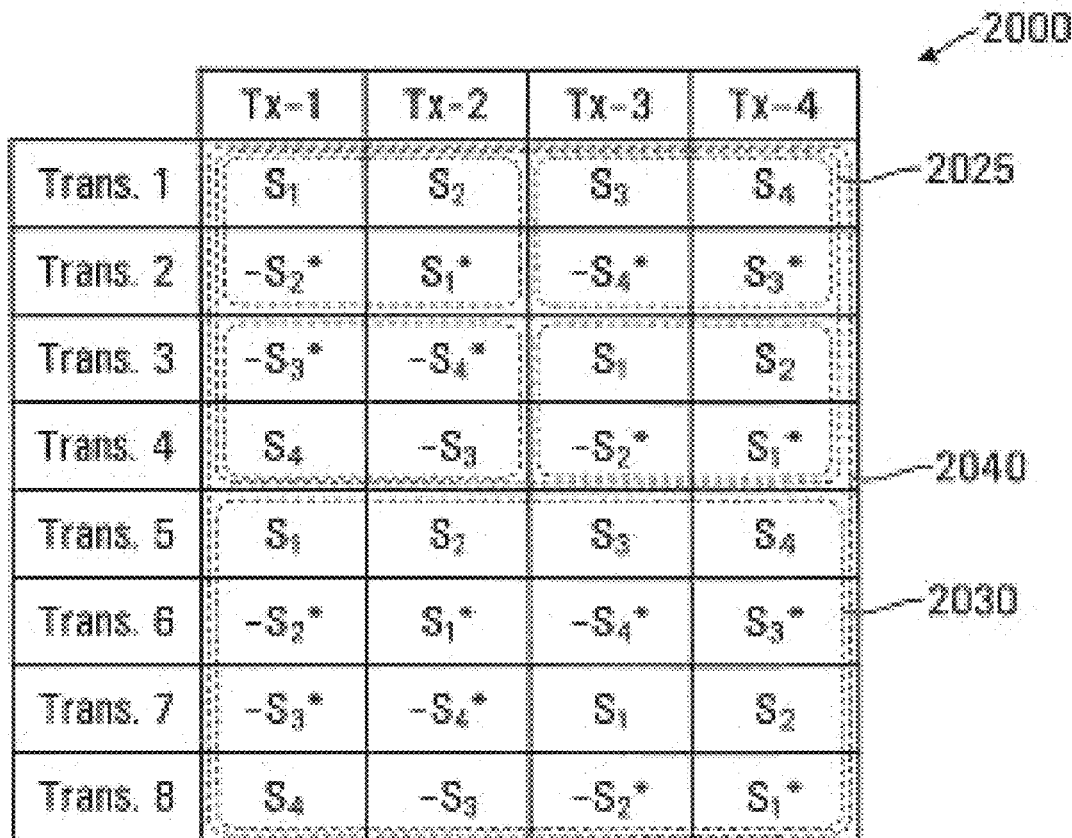
FIG. 20 is a graphical illustration of a mapping table illustrating symbol-level and segment-level Alamouti codes.

Optionally, repeating preset patterns of transmissions may be built into the table by providing additional rows of transmission resources and populating them with repetitions of the transmission patterns. FIG. 20 illustrates a mapping table 2000 comprising a block 2040 of two identical segments 2025, 2035. In an example where the transmission resources are time intervals, the segment 2025 is followed by an identical copy of itself, segment 2030.

In the example of FIGS. 17A-17C, the mapping table comprises a single secondary segment 1725. It is to be understood that a mapping table may comprise several secondary segments 1725. Furthermore, as will be described more fully below, a mapping table may comprise additional layers of nested Alamouti codes.

Although the mapping table 1700 was comprised of symbols derived from four symbols S1, S2, S3, S4 which matched the number of antennae Tx-1, Tx-2, Tx-3, Tx-4, it should be understood that this such matching of the number of symbols and antenna is not necessary. For example, a mapping table may be built from a lower number of symbols than antennae. Additional antennae may be used to send additional or modified (e.g., conjugates and/or negatives) copies of the transmitted symbols.

FIG. 18 shows a mapping table 1800 for a transmission scheme for transmitting over 8 antennae Tx-1, . . . Tx-8. In this example, the symbols in the mapping table 1800 are all derived from four symbols S1, S2, S3, S4. As shown, in this example the mapping table comprises a tertiary segment 1850, which is made up of secondary segments 1825, 1830, 1835, 1840.

As shown, the secondary segment 1825 is made up of the same symbols as secondary segment 1725 of the example of FIG. 17C. In other words, like secondary segment 1725, secondary segment 1825 comprises four primary segments 1805, 1810, 1815, 1820, which each have four single-symbol components and which make up Alamouti codes. The primary segments 1805, 1810, 1815, 1820 within secondary segment 1825 together form a segment-level Alamouti code, like the primary segments 1705, 1710, 1715, 1720 in secondary segment 1725. Since there are eight antennae, eight symbols can be transmitted per transmission resource. Accordingly, there are eight symbol cells per transmission resource Trans. i. These eight cells are filled by providing mapping table with a secondary cell 1830, which is a copy of secondary cell 1825. Thus secondary cell 1830 is also comprised of primary segments arranged in a segment-level Alamouti code, which themselves are Alamouti codes.

Secondary segments 1835 and 1840 are such that secondary segments 1825, 1830, 1835, 1840 themselves make up a (secondary) segment-level Alamouti code. As such, the tertiary segment 1850 itself defines a segment-level Alamouti code (at the secondary segment level). Thus, there are three layers of nested Alamouti codes: the primary segments are Alamouti codes, the secondary segments are segment-level Alamouti codes (at the primary level) and the tertiary segment is a segment-level Alamouti code (at the secondary level). It will be noted that secondary segments 1835 and 1840 are also segment-level Alamouti codes and that they can be divided into four-cell primary segments that are themselves Alamouti codes. Thus nesting Alamouti codes may preserve lower layers of Alamouti codes.

In the above example, the symbols in the mapping table 1800 are all derived from four symbols S1, S2, S3, S4. It will be understood that such triple-nesting of Alamouti codes could also be done with other numbers of symbols. For example, eight symbols S1, S2, S3, S4, S5, S6, S7, S8 could have made up the first transmission resource Trans. 1, with the rest of the mapping table following the pattern of Alamouti codes described above. In such a case, secondary segment 1830 would not be identical to secondary segment 1825, but rather would comprise symbols S5, S6, S7, S8 and conjugates and/or negatives thereof.

Figure 19:
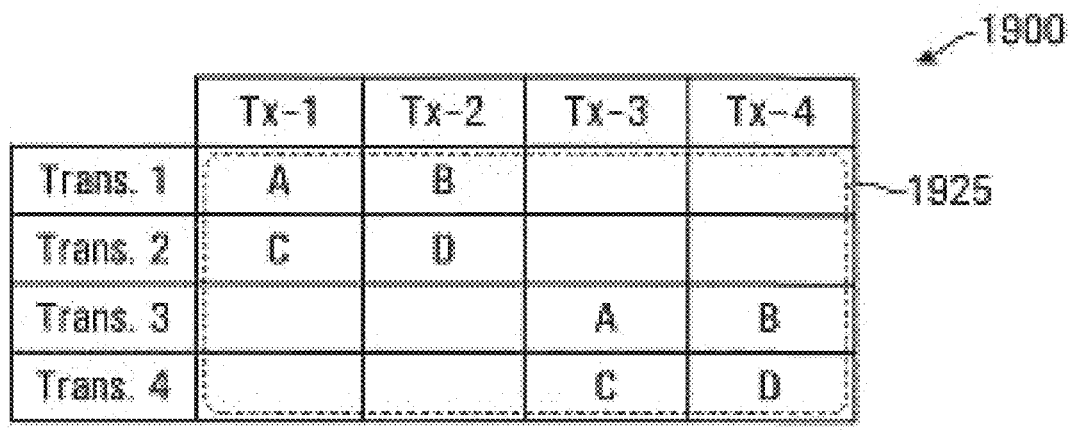
FIG. 19 is a graphical illustration of a mapping table illustrating a partial segment-level Alamouti code.

It is to be understood that as described above in respect of primary segments, secondary segments also need not be contiguous. Furthermore, segments need not be adjacent. Furthermore, Alamouti codes and segment-level Alamouti codes can be cropped to remove certain portions thereof. For example, with reference to FIG. 17A, although the secondary segment 1725 comprises all four primary segments 1705, 1710, 1715, 1720 in their entirety which together form the segment-level Alamouti code, it should be understood that the secondary segment may comprise only subset of the overall segment-level Alamouti code. Some symbols of the complete segment-level Alamouti code may be removed, or otherwise omitted, from the secondary segment, for example to create a partially-filled matrix, as shown in FIG. 19. In this example, segments 1710 and 1715 have been removed to create a partially filled matrix. As shown, the mapping table 1900 of FIG. 19 comprises such a partially-filled matrix in a secondary segment 1925 which defines a segment-level Alamouti code that is a partial segment-level Alamouti code. Although the partially filled matrix of the secondary segment 1925 comprises empty cells, it is to be understood that in alternative embodiments, these cells could be filled with other symbols not forming part of the partial Alamouti code. It will be appreciated that partial symbol-level Alamouti codes wherein certain symbols have been omitted may be used as well, for example in the case of a retransmission where some of the symbols previously transmitted have been properly received and need not be retransmitted.

The above-described embodiments of the present application are intended to be examples only. Those of skill in the art may affect alterations, modifications and variations to the particular embodiments without departing from the scope of the application.

What is claimed is:

1. A wireless station, comprising:
 at least one processor, connected to transmit circuitry, wherein the at least one processor is configured to:
  form a plurality of primary segments, wherein a primary segment comprises a plurality of symbols that define a symbol-level orthogonal block code that comprises a first set of two symbols and a second set of two symbols comprising transformations of the first set of two symbols;
  map the plurality of primary segments to a plurality of sets subcarriers of an orthogonal frequency division multiplexing (OFDM) symbol for a first, second, third, and fourth transmission antennae, wherein to map the plurality of segments, the at least one processor is configured to:
   map a first primary segment of the plurality of primary segments on a first and third transmission antennae and to a first set of two subcarriers of a plurality of sets sub carriers of the OFDM symbol; and
   map a second primary segment of the plurality of primary segments on a second and fourth transmission antennae and to a second set of two subcarriers of the plurality of sets subcarriers of the OFDM symbol, wherein the first set of two subcarriers is different than the second set of two subcarriers;
  wherein, for each primary segment, the first set of two symbols is mapped to different subcarriers than the second set of two symbols and the two symbols of each of the first and second sets are mapped to different antennae;
  wherein, for at least one of the primary segments, the two subcarriers of the respective set of subcarriers are separated by at least one subcarrier to which none of the plurality of components within the plurality of segments are mapped; and
 send, to the transmit circuitry for wireless transmission, an output comprising the mapped plurality of primary segments on the OFDM symbol.

2. The wireless station of claim 1,
 wherein the mapping of each of the primary segments is to non-adjacent antennae.

3. The wireless station of claim 1,
 wherein the orthogonal block code is an Alamouti based code.

4. The wireless station of claim 1,
 wherein the transformation of a given symbol comprises one or more of a negative, a complex conjugate, or a negative complex conjugate of the given symbol.

5. The wireless station of claim 1,
 wherein the at least one processor is further configured to:
  map a repetition or modified repetition of the plurality of primary segments to the plurality of sets of subcarriers for a fifth, sixth, seventh and eight transmission antennae.

6. The wireless station of claim 1,
 wherein the mapping comprises symbols forming at least a part of a segment-level Alamouti based code.

7. The wireless station of claim 6,
 wherein the mapping omits a portion of symbols or segments of the complete segment-level Alamouti code.

8. An apparatus, comprising:
 a memory; and
 a processing element coupled to the memory, wherein the processing element is configured to:
  receive an orthogonal frequency division multiplexing (OFDM) symbol comprising a plurality of primary segments, wherein the plurality of primary segments are received on a plurality of sets of subcarriers from a first, second, third, and fourth transmission antennae, wherein a primary segment comprises a plurality of symbols that define a symbol-level orthogonal block code that comprises a first set of two symbols and a second set of two symbols comprising transformations of the first set of two symbols;
 wherein, to receive the OFDM symbol comprising the plurality of primary segments, the processing element is further configured to:
  receive a first primary segment of the plurality of primary segments from the first and third transmission antennae on a first set of two subcarriers of a plurality of sets subcarriers of the OFDM symbol; and
  receive a second primary segment of the plurality of primary segments from the second and fourth transmission antennae on a second set of two subcarriers of the plurality of sets subcarriers of the OFDM symbol, wherein the first set of two subcarriers is different than the second set of two subcarriers;

wherein, for each primary segment, the first set of two symbols is received on different subcarriers than the second set of two symbols and the two symbols of each of the first and second sets are received on different antennae;

wherein, for at least one of the primary segments, the two subcarriers of the respective set of two subcarriers are separated by at least one subcarrier on which none of the plurality of components within the plurality of segments are received.

9. The apparatus of claim 8,
wherein, to receive the signal, the processing element is further configured to receive each of the primary segments from a set of non-adjacent antennae.

10. The apparatus of claim 8,
wherein the orthogonal block code is an Alamouti based code.

11. The apparatus of claim 8,
wherein the transformation of a given symbol comprises one or more of a negative, a complex conjugate, or a negative complex conjugate of the given symbol.

12. The apparatus of claim 8,
wherein the processing element is further configured to:
receive a signal comprising a repetition or modified repetition of the plurality of primary segments on the plurality of sets of resources from a fifth, sixth, seventh and eight transmission antennae.

13. The apparatus of claim 8,
wherein, to receive the signal, the processing element is further configured to receive symbols forming at least a part of a segment-level Alamouti based code.

14. The apparatus of claim 13,
wherein a portion of symbols or segments of the complete segment-level Alamouti code have been omitted.

15. An apparatus, comprising:
a memory; and
a processing element coupled to the memory, wherein the processing element is configured to:
receive an orthogonal frequency division multiplexing (OFDM) symbol comprising a plurality of primary segments, wherein the plurality of primary segments are received on a plurality of sets of subcarriers from a first, second, third, and fourth transmission antennae according to a mapping, wherein a primary segment comprises a plurality of symbols that define a symbol-level orthogonal block code that comprises a first set of two symbols and a second set of two symbols comprising transformations of the first set of two symbols;
wherein the mapping comprises:
a first primary segment of the plurality of primary segments mapped on the first and third transmission antennae and to a first set of two subcarriers of a plurality of sets subcarriers of the OFDM symbol; and
a second primary segment of the plurality of primary segments mapped on the second and fourth transmission antennae and to a second set of two subcarriers of a plurality of sets subcarriers of the OFDM symbol, wherein the first set of two subcarriers is different than the second set of two subcarriers;
wherein for each primary segment the first set of two symbols is mapped to different transmission subcarriers than the second set of two symbols and the two symbols of each of the first and second sets are mapped to different antennae; and
wherein for at least one of the primary segments, the two subcarriers of the respective set of subcarriers are separated by at least one subcarriers to which none of the plurality of components within the plurality of segments are mapped.

16. The apparatus of claim 15,
wherein the mapping further comprises of each of the primary segments mapped to non-adjacent antennae.

17. The apparatus of claim 15,
wherein the orthogonal block code is an Alamouti based code.

18. The apparatus of claim 15,
wherein the transformation of a given symbol comprises one or more of a negative, a complex conjugate or a negative complex conjugate of the given symbol.

19. The apparatus of claim 15,
wherein the processing element is configured to:
receive a signal comprising a repetition or modified repetition of the plurality of primary segments on the plurality of sets of resources from a fifth, sixth, seventh and eight transmission antennae.

20. The apparatus of claim 15,
wherein the mapping comprises symbols forming at least a part of a segment-level Alamouti based code, wherein the mapping omits a portion of symbols or segments of the complete segment-level Alamouti code.

* * * * *